United States Patent [19]

Smits et al.

[11] Patent Number: 5,680,029
[45] Date of Patent: Oct. 21, 1997

[54] APPARATUS FOR RECHARGING A BATTERY

[75] Inventors: Wilhelmus J. M. Smits, Eindhoven; Eduard E. A. Gillissen, Heerlen; Johann R. G. C. M. Van Beek; Gerardus H. J. Somers, both of Eindhoven, all of Netherlands

[73] Assignee: U.S. Philips Corporation, New York, N.Y.

[21] Appl. No.: 639,994

[22] Filed: Apr. 26, 1996

[30] Foreign Application Priority Data

Apr. 28, 1995 [EP] European Pat. Off. ............ 95201110

[51] Int. Cl.[6] ................ H01M 10/44; H01M 10/46
[52] U.S. Cl. ...................... 320/2; 320/46; 429/93
[58] Field of Search ................ 320/2, 5, 12, 29, 320/30, 31, 43, 46, 47; 340/636; 324/435, 207.13, 207.21, 209; 429/93

[56] References Cited

U.S. PATENT DOCUMENTS

| | | | |
|---|---|---|---|
| 4,371,272 | 2/1983 | Iwasaki | 336/45 X |
| 4,379,816 | 4/1983 | Mullersman et al. | 320/48 X |
| 4,689,544 | 8/1987 | Standnick et al. | 320/46 |
| 5,260,638 | 11/1993 | Hirahara | 320/46 |
| 5,438,249 | 8/1995 | Chang et al. | 320/48 X |
| 5,567,541 | 10/1996 | Rouhani | 429/93 |

FOREIGN PATENT DOCUMENTS 268445  7/1988  Japan .
326027  10/1993  Japan .

Primary Examiner—Edward Tso
Attorney, Agent, or Firm—Bernard Franzblau

[57] ABSTRACT

Apparatus for recharging a battery, comprising a compartment which holds the battery so that its electrical terminals are in contact with a pair of electrodes. The electrodes are connectable to the poles of a controllable source of electrical energy. In the compartment a ferromagnetic body is positioned so as to be subjected to mechanical stress in response to mechanical deformation of the battery. An electrical device monitors the magnetic permeability $\mu$ of the ferromagnetic body by measuring the self-inductance of a coil surrounding at least a portion of the ferromagnetic body. The $\mu$ of the ferromagnetic body changes by magnetostrictive effects arising from mechanical stress of the ferromagnetic body in response to mechanical deformation of the battery (5) during charging. Expansion of the battery can be used as an indicator that charging has been completed, and that the battery should be disconnected from the source of electrical energy.

9 Claims, 1 Drawing Sheet

APPARATUS FOR RECHARGING A BATTERY

BACKGROUND OF THE INVENTION

1. Field of the Invention

The invention relates to an apparatus for recharging a battery, comprising a compartment into which the battery can be placed so that its electrical terminals are in contact with a pair of electrodes, said electrodes being connectable to corresponding poles of a controllable source of electrical energy.

The invention also relates to a method of recharging a battery, in which changes in a given physical parameter are electronically monitored and exploited as an indicator of the accumulated quantity of electrical charge in the battery.

The term "battery" is here intended to refer to either single cells or battery packs, and refers specifically to secondary (i.e. rechargeable) batteries.

2. State of the Art

An apparatus and method as specified hereabove are known inter alia from laid-open Japanese Patent Applications JP 63-268445 (filed Apr. 24, 1987) and JP 5-326027 (filed May 22, 1992). These documents describe how the physical dimensions of a battery can change as a result of increased internal pressure and temperature during charging. Such increase is attributable to the occurrence of certain chemical reactions within the battery, the rate and type of which are determined by the battery's charge state at any given time. In particular, at the end of a charging procedure, additional electrical energy supplied to the battery will, in general, no longer cause an increase in its internal charge, but will instead provoke a sharp rise in the battery's internal pressure and temperature, causing the battery to expand (these effects being particularly prominent in NiCd and NiMH batteries). Using a mechanical strain gauge in contact with the battery casing, such mechanical deformation of the battery can be measured. The detection of (the onset of) sharply increasing deformation can then be used as an indication that efficient charging has been completed, and that the electrical energy source should be switched off.

With the aid of calibration experiments, it is possible to monitor the mechanical strain in a battery as a function of charging time, whilst simultaneously measuring the quantity of charge supplied to the battery. When recharging the battery on subsequent occasions, the measured strain at any given time then allows the corresponding charge value to be deduced. In this way, the electrical voltage and/or current supplied to the battery during charging can, if so desired, be automatically tailored to particular requirements. For example, it is possible to automatically interrupt charging when the battery is 90% charged, or to slow down the charging procedure as charge saturation is approached.

SUMMARY OF THE INVENTION

It is an object of the invention to provide an alternative method of monitoring the mechanical deformation of a battery during recharging, without reliance on a mechanical strain gauge. In particular, it is an object of the invention that such a method should be accurate and sensitive.

These and other objects are achieved in an apparatus as specified in the opening paragraph, characterised in that the compartment comprises a ferromagnetic body which is positioned so as to be subjected to mechanical stress in response to mechanical deformation of the battery, and that the apparatus comprises electrical means for monitoring the magnetic permeability of the ferromagnetic body.

The inventive apparatus exploits the insight that, when subjected to mechanical stress, a ferromagnetic body demonstrates a change in magnetic permeability ($\mu$) as a result of magnetostriction effects. This phenomenon is elucidated in more detail by S. Chikazumi in *Physics of Magnetism*, John Wiley & Sons (1964); see chapter 8, and particularly section 8.4. If, therefore, the ferromagnetic body is positioned so as to experience a mechanical force as a result of expansion of the battery during charging, then such expansion will lead to a change in the value of $\mu$, which, in turn, can be monitored electrically.

In a preferential embodiment of the inventive apparatus, the electrical means for monitoring $\mu$ comprise a coil of conductive material which surrounds at least a potion of the ferromagnetic body and which is connected to an electrical circuit for measuring the self-inductance (L) of the coil, which circuit comprises an electrical oscillator. In principle, such a "coil" need only comprise a single loop, but a multiple-loop coil is preferable, since it has a larger inductance (assuming other parameters, such as the loop area, to be equal).

In a variant of the embodiment elucidated in the previous paragraph, the coil is connected across an AC voltage source, and L is then measured by further incorporating the coil in one leg of a Wheatstone bridge. Alternatively, by employing a second coil which is part of an electrical oscillator circuit, and by placing this second coil in the vicinity of the coil already referred to hereabove, the value of $\mu$ can be indirectly monitored by measuring the inductance of the second coil (mutual inductance).

In all such embodiments, it is advantageous if the ferromagnetic body is a closed magnetic circuit, so as to conserve magnetic flux and optimise the sensitivity of induction measurements. In particular, the body may simply take the form of a ring.

Whatever way the electrical means for monitoring $\mu$ are embodied, a further embodiment of the inventive apparatus can be characterised in that these means are embodied to generate an output signal which is dependent on $\mu$, and that this signal serves as an input signal to regulate the controllable source of electrical energy.

A preferential embodiment of the apparatus according to the invention is characterised in that the ferromagnetic body comprises ferrite material, e.g. MnZn ferrite. Such materials have a relatively high value of $\mu$ (at room temperature), and are commercially available in various forms, including rings. Other materials which can be applied in the ferromagnetic body include, for example, NiFe alloys, FeNiCo alloys, Sendust, etc.

It should be noted that the inventive apparatus is also suitable for detecting over-discharging of a battery, since this is also accompanied by internal gas generation and attendant expansion of the battery. In such a scenario, the measured expansion of the battery beyond a certain point can be used as a signal to terminate further discharging.

BRIEF DESCRIPTION OF THE DRAWINGS

The invention and its attendant advantages will be further elucidated with the aid of exemplary embodiments and the accompanying schematic Figures, whereby.

DETAILED DESCRIPTION OF THE PREFERRED EMBODIMENTS

Embodiment 1

Figure 1:
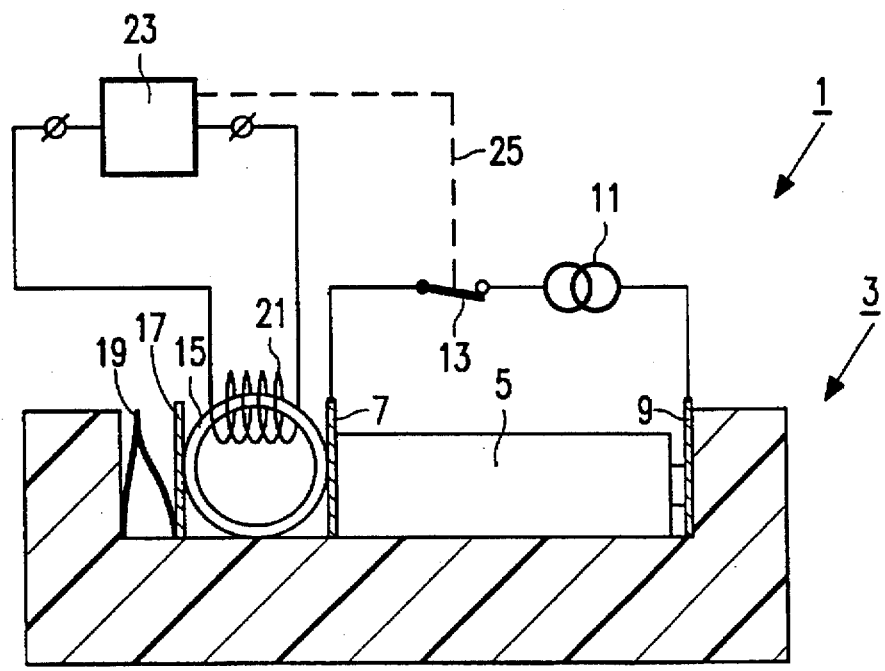
FIG. 1 depicts an aparatus in accordance with the invention.

FIG. 1 shows an apparatus 1 in accordance with the present invention. This apparatus 1 comprises a compartment 3 into which a battery 5 can be placed. The battery 5 is thus positioned that its terminals are in contact with a pair of electrodes 7, 9. These electrodes 7, 9 are in turn connected to a source 11 of electrical energy, which can be switched with the aid of a switch 13.

Also depicted is a ring 15 of ferromagnetic material, which is located between the electrode 7 and a plate 17. Elastic means 19 (such as a spring) are located between the plate 17 and a wall of the compartment 3. These elastic means 19 are preferably relatively rigid, so that both the ring 15 and the battery 5 are tightly pressed against the plate 17.

A coil 21 of insulated copper wire is wound around at least part of the ring 15, and is further connected to electrical means 23. In conjunction with these means 23, the coil 21 forms part of an electrical oscillator circuit. This circuit can be used to measure the self-inductance L of the coil 21, which is in turn dependent upon the permeability μ of the ferromagnetic material in the ring 15.

In order to charge the battery 5, the switch 13 must be closed. As charging approaches completion, the pressure and temperature within the battery 5 tend to rise relatively sharply, causing it to expand slightly. As a result of this expansion, pressure is exercised on the ring 15, leading to a change in the value of μ via magnetostriction.

A relatively sharp change in L can therefore be employed as an indicator that the charging procedure is approaching its completion. If so desired, the means 23 can be connected to the switch 13 via a signal carrier 25; dependent on the measured value of L, an appropriate signal from the means 23 can then be used to open the switch 13 automatically.

Embodiment 2

Figure 2:
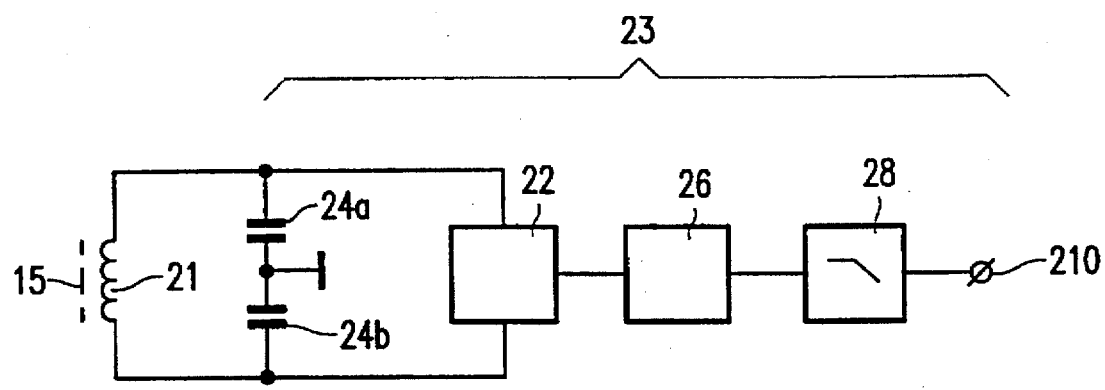
FIG. 2 depicts electrical means suitable for use in monitoring the magnetic permeability of the ferromagnetic body employed in the apparatus in FIG. 1.

FIG. 2 depicts a suitable embodiment of the electrical means 23 employed to monitor the magnetic permeability μ of the ferromagnetic body 15 in the apparatus of FIG. 1. Corresponding features in FIGS. 2 and 1 are denoted by the same reference symbols.

The coil 21 in FIG. 1 is connected across an oscillator 22, in parallel with a pair of series-connected capacitors 24a, 24b which are saddled about ground, thereby forming a resonance circuit. The oscillator 22 is further connected to a frequency-to-voltage converter 26, whose output signal is passed to an output 210 via a low-pass filter 28.

Changes in the inductance L of the coil 21 cause corresponding changes in the frequency f of the oscillator 22. The instantaneous value of this frequency f is convened into a corresponding voltage by the converter 26. The voltage V measured at the output 210 of the filter 28 is therefore a function of f, which is itself a function of L, and therefore also of μ.

If so desired, the value of the measured voltage V at the output 210 may be passed to a comparator (not depicted), where it can be compared with a reference voltage value $V_0$. Referring to FIG. 1, the condition $V=V_0$ can then be used to trigger a relay (via the carrier 25) so as to open (or close) the switch 13.

We claim:

1. Apparatus for recharging a battery, comprising:

a compartment which holds the battery so that its electrical terminals are in contact with a pair of electrodes, said electrodes being connectable to respective poles of a controllable source of electrical energy, a ferromagnetic body positioned in the compartment so as to be subjected to mechanical stress in response to mechanical deformation of the battery, and electrical means for monitoring the magnetic permeability of the ferromagnetic body.

2. Apparatus according to claim 1, wherein the electrical means comprise a coil of conductive material which surrounds at least a portion of the ferromagnetic body and which is connected to an electrical circuit for measuring the self-inductance of the coil, which circuit comprises an electrical oscillator.

3. Apparatus according to claim 1, wherein the electrical means to generate an output signal which is dependent on the magnetic permeability of the ferromagnetic body, and wherein said signal serves as an input signal to regulate the controllable source of electrical energy.

4. Apparatus according to claim 3, wherein the ferromagnetic body is a closed magnetic circuit.

5. Apparatus according to claim 1, wherein the ferromagnetic body comprises ferrite material.

6. Apparatus according to claim 2, wherein the electrical means generate an output signal which is dependent on the magnetic permeability of the ferromagnetic body, and wherein said signal serves as an input signal to regulate the controllable source of electrical energy.

7. Apparatus according to claim 2, wherein the ferromagnetic body is a closed magnetic circuit.

8. Apparatus according to claim 3 wherein the ferromagnetic body comprises a ferrite material.

9. Method of recharging a battery, which comprises: electrically monitoring changes in the magnetic permeability of a ferromagnetic body and using same as an indicator of the accumulated quantity of electrical charge in the battery, wherein the magnetic permeability of the ferromagnetic body is monitored by measuring the electrical inductance of a coil surrounding at least a portion of the ferromagnetic body, and which is caused to change by magnetostrictive effects arising from mechanical stress of the ferromagnetic body in response to mechanical deformation of the battery during charging.

* * * * *